United States Patent
Kaser et al.

(10) Patent No.: US 7,231,958 B1
(45) Date of Patent: Jun. 19, 2007

(54) REINFORCED SEALING ELEMENT

(75) Inventors: Jack Kaser, Homeland, CA (US);
Deborah Kaser, Homeland, CA (US)

(73) Assignee: Paragon Airheater Technologies, LLC, Corona, CA (US)

( * ) Notice: Subject to any disclaimer, the term of this patent is extended or adjusted under 35 U.S.C. 154(b) by 390 days.

(21) Appl. No.: 10/675,595

(22) Filed: Sep. 30, 2003

Related U.S. Application Data

(60) Provisional application No. 60/415,710, filed on Oct. 1, 2002.

(51) Int. Cl.
*F23L 15/02* (2006.01)

(52) U.S. Cl. .................... 165/9; 165/DIG. 20; 277/550

(58) Field of Classification Search .............. 165/4–10; 277/370, 922, 549, 53
See application file for complete search history.

(56) References Cited

U.S. PATENT DOCUMENTS

| | | | |
|---|---|---|---|
| 2,517,512 A | 8/1950 | Tigges et al. | |
| 2,680,598 A | 6/1954 | Trulsson et al. | |
| 2,684,230 A | 7/1954 | Hammond | |
| 2,761,654 A | 9/1956 | Valvo | |
| 2,766,970 A | 10/1956 | Horn | |
| 3,016,231 A | 1/1962 | Muller | |
| 3,113,526 A | 12/1963 | Paschke | |
| 3,703,206 A | 11/1972 | Barnard | |
| 3,845,545 A | 11/1974 | Surrall et al. | |
| 3,882,927 A | 5/1975 | Penny | |
| 3,954,135 A * | 5/1976 | Hewlitt ........................... | 165/9 |
| 3,977,465 A | 8/1976 | Tank | |
| 4,056,141 A * | 11/1977 | Sakaki ........................... | 165/9 |
| 4,084,634 A | 4/1978 | Handa | |
| 4,143,882 A | 3/1979 | Kobayashi | |
| 4,173,252 A | 11/1979 | Sakaki et al. | |
| 4,433,848 A | 2/1984 | Williams | |
| 4,593,750 A * | 6/1986 | Finnemore ..................... | 165/9 |
| 4,673,026 A * | 6/1987 | Hagar et al. ................... | 165/9 |

(Continued)

FOREIGN PATENT DOCUMENTS

GB      2250790      12/1990

OTHER PUBLICATIONS

Mac Duff and Clark, —Ljungstrom Air Preheater Design and Operation- Jan. 1976—Combustion.

*Primary Examiner*—Leonard R. Leo
(74) *Attorney, Agent, or Firm*—Knobbe Martens Olson & Bear LLP

(57) ABSTRACT

A seal for a regenerative air preheater. The seal is comprised of two members that each have a plurality of tabs and slots. The tabs and slots interlock so that the tabs on one member are positioned adjacent the slots on the other member. The tabs have a narrow neck section and a wider sealing section. The wider sealing sections overlay and the narrow neck sections are positioned within a recessed region of the notch on the opposite member so as to interlock the two members. The seal is mounted either to the rotor or to the inner wall of the housing so as to extend through the bypass gap between the rotor and the inner wall of the housing. As the tabs are flexible, the tabs may resiliently deform as a result of the tabs making contact with the sealing surface of the heat exchanger. The air preheater further comprises a reinforcing section that stabilizes the tabs when the tabs resiliently deform.

31 Claims, 10 Drawing Sheets

U.S. PATENT DOCUMENTS

| | | | |
|---|---|---|---|
| 4,720,969 A * | 1/1988 | Jackman | 165/9 |
| 4,791,980 A | 12/1988 | Hagar et al. | |
| 4,940,080 A * | 7/1990 | Reeves et al. | 165/9 |
| 4,997,028 A * | 3/1991 | Townsend | 165/9 |
| 5,137,078 A | 8/1992 | Borowy | |
| 5,228,703 A | 7/1993 | White | |
| 5,657,998 A | 8/1997 | Dinc et al. | |
| 5,881,799 A * | 3/1999 | Kozacka et al. | 165/9 |
| 5,950,707 A | 9/1999 | Kozacka et al. | |
| 6,598,664 B2 * | 7/2003 | Fierle et al. | 165/9 |
| 6,789,605 B1 * | 9/2004 | Kaser | 165/9 |

\* cited by examiner

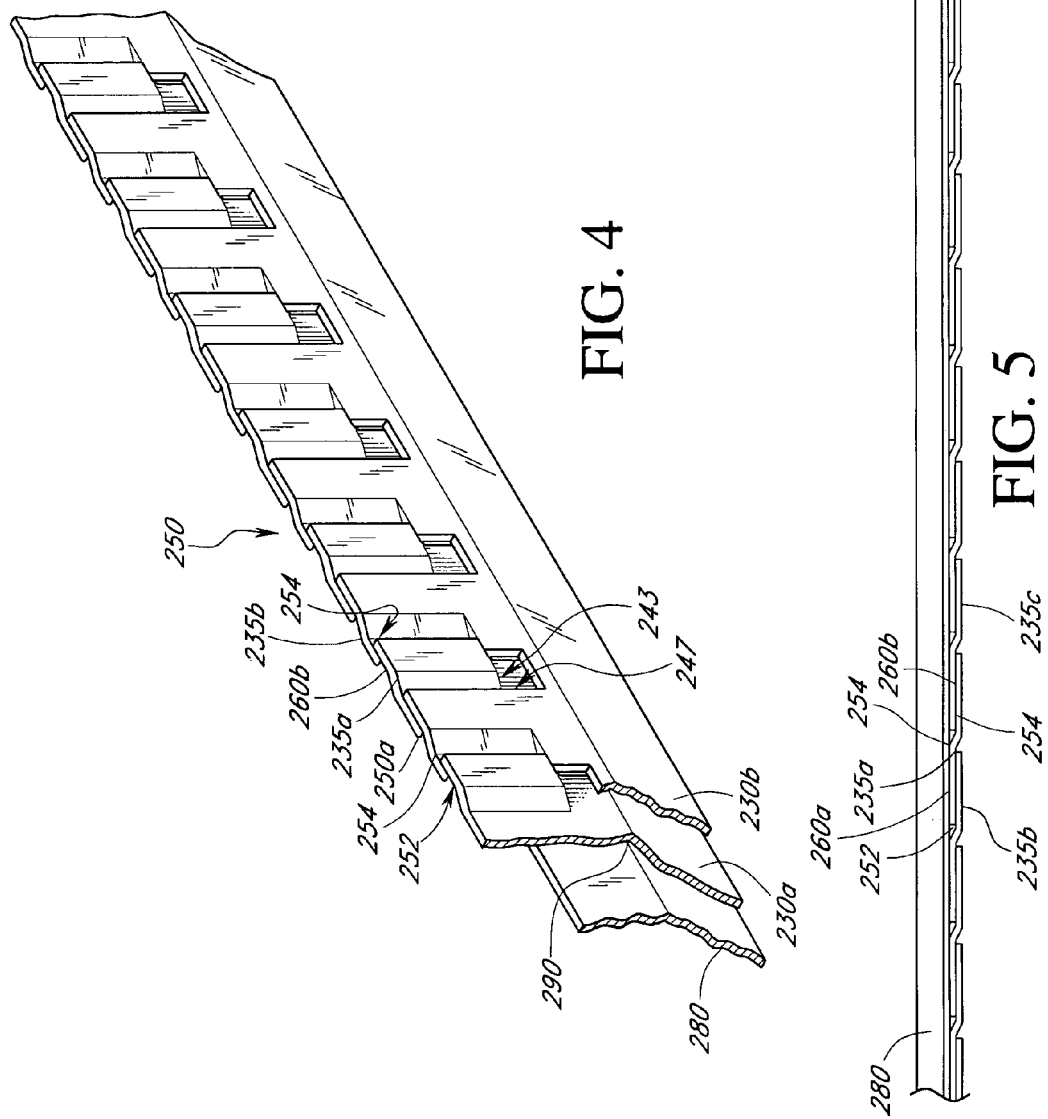

REINFORCED SEALING ELEMENT

CLAIM OF PRIORITY

This U.S. patent application claims priority to U.S. Provisional Patent Application No. 60/415,710, entitled "Reinforced Sealing Element" filed Oct. 1, 2002, which is hereby incorporated in it entirety by reference herein.

BACKGROUND OF THE INVENTION

1. Field of the Invention

The present invention relates to heat exchange technology and, in particular, relates to an improved seal that may be used to reduce leakage between a hot gas conduit and a cold air conduit of a regenerative heat exchanging system.

2. Description of the Related Art

Conventional regenerative heat exchangers are used with many types of machinery that exhaust hot gas and operate more efficiently when supplied with preheated air. These types of machinery include power plants, chemical processors, refineries, pulp and paper mills, and ship engines. Typically, two fluid stream passages extend through a heat exchanger. The first passage is an exhaust or hot gas conduit that communicates with a hot exhaust outlet of the machinery. Hot exhaust gases flow from the machinery exhaust into the hot gas conduit to the heat exchanger. The second passage is an intake or cold air conduit that communicates with a cold air intake passage of the machinery. The cold air conduit feeds air into the intake passage of the machinery. As is generally known in the art, the regenerative heat exchanger extracts heat from the exhaust gases of the machinery and transfers the heat to the cool air conduit, so that the machinery is supplied with heated intake air which improves the operating efficiency of the machinery.

A conventional heat exchanger typically includes a movable heat exchanging body that moves between the hot gas conduit and the cool air conduit. In most cases, the movable heat exchanging body cyclically collects heat from the exhaust conduit and transfers this heat energy to the intake conduit. One example of this type of heat exchanger may be referred to as a Ljungstrom™-style preheater. The heat exchanging body in a Ljungstrom-style preheater is typically cylindrical in shape and is located in a sealed relationship with an outer housing. The heat exchanging body, typically called a rotor, rotates about a center shaft within the housing of the heat exchanger. A plurality of radial walls extend radially outward from the center shaft and subdivide the heat exchanging body into a plurality of angular sectors. The angular sectors have a core material to provide a path for heated exhaust or intake air to travel through. The core is heated by the exhaust and the heat energy of the core is transferred to the intake air when the heated core is exposed to the intake air. As the heat exchanging body rotates, the angular sectors are alternatively exposed to the hot and cold conduits of the heat exchanging apparatus. Hence, as an angular sector of the heat exchanging body is exposed to the hot conduit, it absorbs heat from the exhaust gases of the machinery. The sector then rotatably moves and is exposed to the intake conduit where the sector then releases heat into the cool air that is passed into the machinery intake.

Unfortunately, a bypass gap exists between the rotor and the inner walls of the housing. Consequently, some heated gas in the exhaust conduit, may flow through the gap between the rotor and the inner wall of the housing and thereby bypass the core material in the rotor. To address this particular problem, seals are typically installed at the upper and lower surfaces of the rotor which extend into the gap between the outer surface of the rotor and the inner surface of the housing. These seals are referred to as either circumferential or bypass seals and they generally extend around the entire circumference of the rotor and occlude the opening between the inner wall of the housing and the outer wall of the rotor.

One difficulty associated with the use of these seals is that the rotor will generally deform during operation as a result of differential thermal expansion. This deformation is typically referred to as turndown and is often exhibited by the outer surfaces of the rotor sagging downward with respect to the center axis and toward the housing. Unfortunately, this may result in these seals becoming unduly worn or damaging the inner walls of the housing.

One possible solution is to use a seal that is flexible so that when the heat exchanger turns down, the seal can resiliently contact the sealing surface. A flexible seal can then be positioned substantially adjacent the sealing surface prior to turndown thereby allowing the seal to substantially occlude the bypass opening over the entire range of deformation of the rotor. However, as the seal will continuously be rubbing against the sealing surface, it is generally desirable that the seal be relatively thick so as to prolong the life of the seal against damage and the continuous wear of rubbing against the sealing surface. However, increasing the thickness of the seal to prolong the life of the seal against damage and wear naturally results in a decrease of the flexibility of the seal.

Certain prior art seals have been equipped with resilient interlocking features that provide independent flexibility while maintaining structural rigidity so as to elastically deform in response to contact with the sealing surface as a result of turndown of the heat exchanging body. For instance, U.S. Pat. No. 5,881,799 discloses an interlocking seal having structurally rigid resilient features that allow for flexible deformations. However, such seals may fracture or break when flexibly responding to rotational stress loads produced by rotation of the heat exchanging body with respect to the outer housing of the heat exchanger. As a result, stress fractures may allow gas leakage between conduits. In addition, the prior art seals typically comprise gaps between the interlocking features that may also allow for some heated gases in the hot gas conduit and some cold air in the cool air conduit to bypass the heat exchanging body. Therefore, while the prior art seals provide some improvement to efficiency loss in heat exchangers, they still result in inefficient operation as air and gases may bypass the heat exchanging body through bypass gaps between interlocking features.

Consequently, there currently exists a need for an improved seal that substantially reduces bypass gas leakage during rotation of the heat exchanging body. To this end, the improved seal should be structurally rigid, resilient, and flexible so that when the heat exchanging body deforms as a result of turndown, the improved seal maintains resilient contact with the sealing surface so as to withstand a significant amount of wear as a result of continuous rubbing contact with the sealing surface.

SUMMARY OF THE INVENTION

The aforementioned needs may be satisfied by a seal assembly for a regenerative air preheater having a heat exchanging body that rotates in a first direction with respect to a housing and is distally spaced from the housing so as to define a gap therebetween. In one embodiment, the seal assembly comprises a sealing section that is positioned to at least partially span the gap between the heat exchanging body and the housing, wherein the sealing section includes a deformable biasing section that engages with at least a portion of both the housing and the heat exchanging body in a manner so as to resiliently deform in a second direction relative to the first direction during rotation. In addition, the seal assembly further comprises a reinforcing member interposed between the housing and the heat exchanging body so as to cover at least a portion of the sealing section, wherein the reinforcing member is positioned with respect to the sealing section so as to reinforce the sealing section when deformed in the second direction to thereby inhibit damage to the sealing section as a result of the deformation during rotation.

In one aspect, the sealing section further comprises a first resilient member with interlocking features and a second resilient member having interlocking features coupled to the interlocking features of the first resilient member. In addition, the coupled interlocking features define the deformable biasing section of the sealing section. Also, the reinforcing member is interposed between the housing and the heat exchanging body so as to cover at least a portion of the interlocking features of at least one of the resilient members.

In another embodiment, the heat exchanging body comprises a rotor. In addition, the sealing section includes a mounting section that mounts to the rotor and a contact section that contacts the housing with the deformable biasing section interposed therebetween. Also, the mounting section and the contact section of the seal member are urged towards each other when the contact section contacts the housing.

In still another aspect, the reinforcing member is mounted to the rotor so that the reinforcing member inhibits movement of the contact section and the mounting section towards each other. In addition, the reinforcing member comprises a biasing section that provides resilient biasing against movement of the contact section of the seal-member towards the mounting section of the seal member. Also, the biasing section of the reinforcing member comprises a bent section that contours the structural shape of at least one of the first and second resilient members. Moreover, the biasing section of the reinforcing member contacts the first and second resilient members so that the reinforcing member inhibits movement of at least a portion of the first and second resilient members in the direction substantially perpendicular to the first direction.

In still another aspect, the reinforcing member further provides a biasing force in a direction relative to the movement of the first and second resilient members. In addition, the reinforcing member comprises a mounting section that mounts to the rotor, a contact section that contacts the seal member, and a biasing section. Also, the biasing section comprises a bent section that is angularly displaced from a position substantially perpendicular to the housing. The contact section comprises an elongate section that contacts at least one of the first and second resilient members so as to oppose movement of the first and second resilient members in the direction substantially perpendicular to the first direction. Moreover, the contact section deflects in the direction substantially perpendicular to the first direction during rotation so as to engage the sealing section and distributes the deflection force along the elongate section. Furthermore, the reinforcing member is positioned adjacent the sealing section so as to define a deflection gap therebetween so that the sealing section deforms the width of the deflection gap prior to engaging the reinforcing member during rotation.

The aforementioned needs may also be satisfied by a regenerative air preheater device comprising, in one embodiment, an enclosure and a rotor that rotates in a first direction with respect to the enclosure and is distally spaced from the enclosure so as to define a bypass gap therebetween. In addition, the device further comprises a seal assembly positioned to at least partially span the bypass gap, wherein the seal assembly comprises a resilient member having a deformable biasing section that resiliently deforms in a second direction relative to the first direction in response to contact with at least a portion of the enclosure during rotation, and wherein the seal assembly further comprises a reinforcing member interposed between the rotor and the resilient member that reinforces the resilient member when the resilient member is deformed in the second direction to thereby inhibit damage to the seal assembly as a result of the deformation during rotation.

The aforementioned needs may also be satisfied by a seal assembly for a regenerative preheater having a sealing surface defined between a rotor and an enclosure that rotate with respect to each other in a first direction. In one embodiment, the seal assembly comprises a sealing member positioned between the rotor and the enclosure, wherein the sealing member comprises at least two resilient sections having interlocking tabs that independently deform in a second direction relative to the first direction of rotation in response to contact with at least a portion of the sealing surface. In addition, the seal assembly comprises a reinforcing member positioned with respect to the sealing member so as to cover at least a portion of the interlocking tabs and reinforce the sealing member when the sealing member is deformed in the second direction to thereby inhibit damage to the sealing member as a result of the deformation.

These and other objects and advantages of the present invention will become more fully apparent from the following description taken in conjunction with the accompanying drawings. The illustrations are intended to illustrate, but not to limit, the invention.

BRIEF DESCRIPTION OF THE DRAWINGS

FIG. 4 illustrates an assembled view of the seal assembly of FIG. 3, wherein the first and second interlocking members are coupled in a manner so as to define a resilient section 250 having a reinforcing member.

FIG. 5 illustrates a top view of the seal assembly shown in FIG. 4.

DETAILED DESCRIPTION OF THE PREFERRED EMBODIMENT

Figure 1:
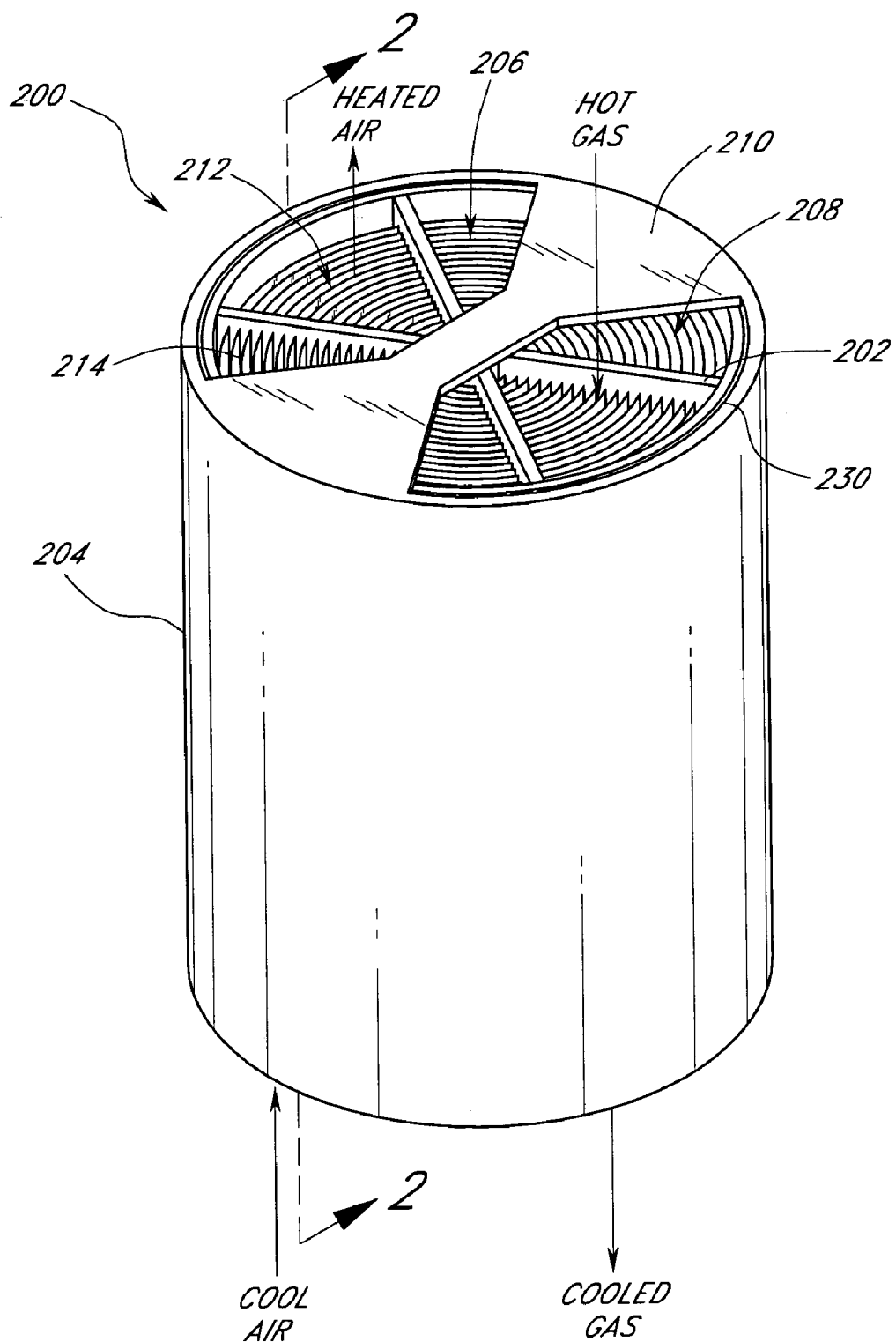
FIG. 1 illustrates a perspective view of one embodiment of a heat exchanger having a seal assembly with a reinforcing member.

Reference will now be made to the drawings wherein like numerals refer to like parts throughout. FIG. 1 illustrates a perspective view of one embodiment of a regenerative heat exchanger 200 in which an improved perimeter seal assembly 230 having at least one reinforcing support member or section 280 (as shown in following FIGS. 2A–6) that may be utilized to reduce gas leakage. As illustrated in FIG. 1, the heat exchanger 200 may comprise a heat exchanger body 202 that is positioned within a housing 204. In this particular embodiment, the heat exchanger body 202 may comprise a cylindrical rotor that is rotatably mounted within the cylindrical housing 204 so as to be coaxial with the cylindrical housing 204. In addition, the heat exchanger housing 204 may be formed so as to define two openings 206, 208, wherein the two openings 206, 208 are respectively connected to duct work (not shown) and respectively form a portion of the intake or cold air conduit and the exhaust or hot gas conduit. Moreover, the housing 204 may also include a sector plate 210, which divides the intake conduit from the exhaust conduit in a generally known manner.

The heat exchanger body or rotor 202 preferably rotates within the housing 204. In one aspect, the rotor 202 may be divided into sectors 212, wherein each of the sectors includes a core material 214 that absorbs heat carried in the exhaust gas in the exhaust conduit and then transfers this heat to the intake air when the heated sector 212 is positioned within the intake conduit. The core material 214 is typically made of thin corrugated metal that will allow exhaust gases to travel therethrough and heat carried within the exhaust gases heats the core material 214 in the exhaust conduit. Similarly, cool air passing through the core material 214 in the intake conduit is heated by the retained heat of the core material 214 during passage of the intake air through the core material 214. Hence, the preheater sequentially exposes the sectors 212 to the hot gas in the exhaust conduit so that the core material 214 is heated and then exposes the heated sectors 212 of core material 214 to the intake conduit so that cool air traveling through the intake conduit can be heated by the core material 214 to thereby supply heated air to the machinery.

It should be appreciated that the above described heat exchanger 200 may operate in a similar manner to the operation of generally known Ljungstrom-type preheaters. It should also be appreciated from the following description that, while this particular embodiment of the perimeter seal assembly may be configured to be used with a Ljungstrom-type preheater, the perimeter seal assembly may be adapted by one skilled in the art to be used with a Rothmule-type preheater, where the rotor is stationary and the ductwork rotates with respect to the rotor, without departing from the scope of the present invention.

Figure 2A:
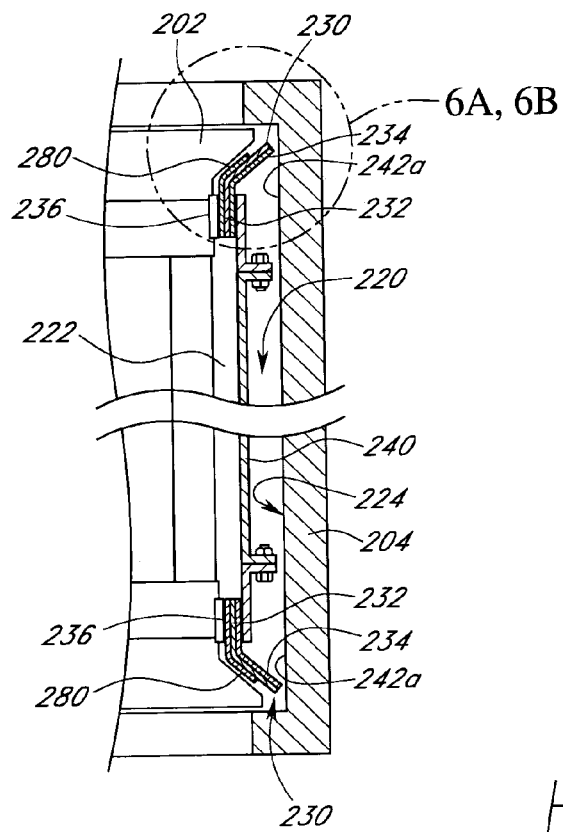
FIG. 2A illustrates a cross-sectional view of one embodiment of the seal assembly in FIG. 1, wherein the seal assembly including the reinforcing member is mounted within the heat exchanger of FIG. 1.
Figure 2B:
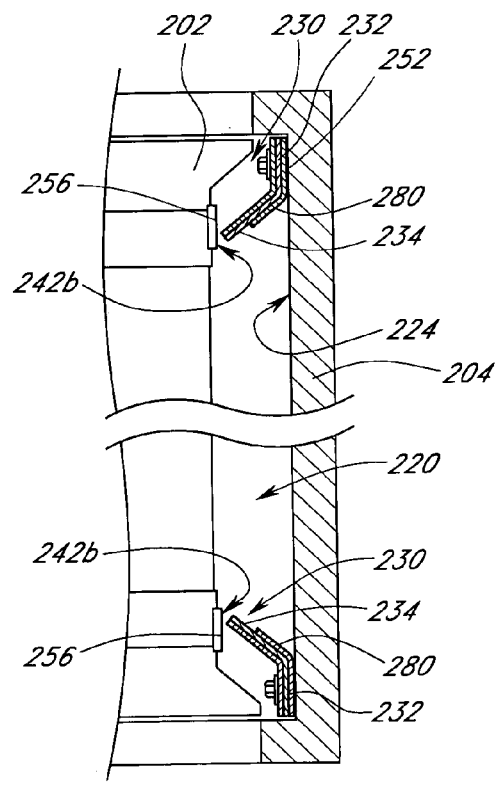
FIG. 2B illustrates a cross-sectional view of another embodiment of the seal assembly in FIG. 1, wherein the seal assembly including the reinforcing member is mounted within the heat exchanger of FIG. 1.

FIGS. 2A, 2B illustrate a bypass gap 220 between the outer periphery 222 of the rotor 202 and the inner wall 224 of the housing 204. In one aspect, the bypass gap 220 provides a path for intake gas or exhaust gas to bypass the rotor core 202 when flowing through the intake conduit or the exhaust conduit. In some circumstances, the bypass gap 220 reduces the efficiency of the preheater 200 as it allows for some exhaust gas to traverse the preheater 200 without heating the core material 214 and further allows intake air to traverse the preheater 200 without being heated by the core material 214. To address this particular problem, the improved perimeter seal assemblies 230 may be mounted adjacent the upper and lower ends of the rotor 202 so as to extend across the bypass gap 220 to reduce the ability of intake air or exhaust gas to bypass the rotor 202.

FIG. 2A further illustrates one embodiment of the perimeter seal assembly 230, wherein the seal assembly 230 may be fixedly attached to the rotor 202 using generally known mounting elements, such as nuts and bolts. In one aspect, the perimeter seal assembly 230 may be referred to as a circumferential seal assembly. As shown in FIG. 2A, the perimeter seal assembly 230 may comprise a plurality of sections, including a mounting section 232, a sealing section 234, and the reinforcing section 280. The mounting section 232 may be attached to the outer wall 222 of the rotor 202 and a mounting plate 240. The seal assembly 230 may be bent in a manner so as to define a sealing section 234 that may be positioned substantially adjacent to a sealing surface 242a which, in one embodiment, may comprise the inner wall 224 of the housing 204.

FIG. 2B illustrates another embodiment of the perimeter seal assembly 230 mounted in the bypass gap 220 to prevent air and gas from bypassing the rotor 202. Similar to the previous embodiment in FIG. 2A, the seal assembly 230 may also comprise a mounting section 232 and a sealing section 234, wherein the mounting section 234 may be attached to the inner wall 224 of the housing 204 in a position adjacent the upper and lower ends of the housing 204 using generally known mounting elements, such as nuts and bolts. In one aspect, this type of perimeter seal assembly 230 may be referred to as a bypass seal assembly.

In one embodiment, the sealing section 234 of the seal assembly 230 extends into the bypass gap 220 so as to be positioned adjacent a sealing surface 242b. In addition, the sealing surface 242b may comprise a sealing plate 256 that extends circumferentially around the entire rotor 202. It should be appreciated that the manner in which the perimeter seal assemblies 230 are mounted may vary depending upon the particular configuration of the heat exchanger unit 200 without departing from the scope of the present teachings.

Figure 3:
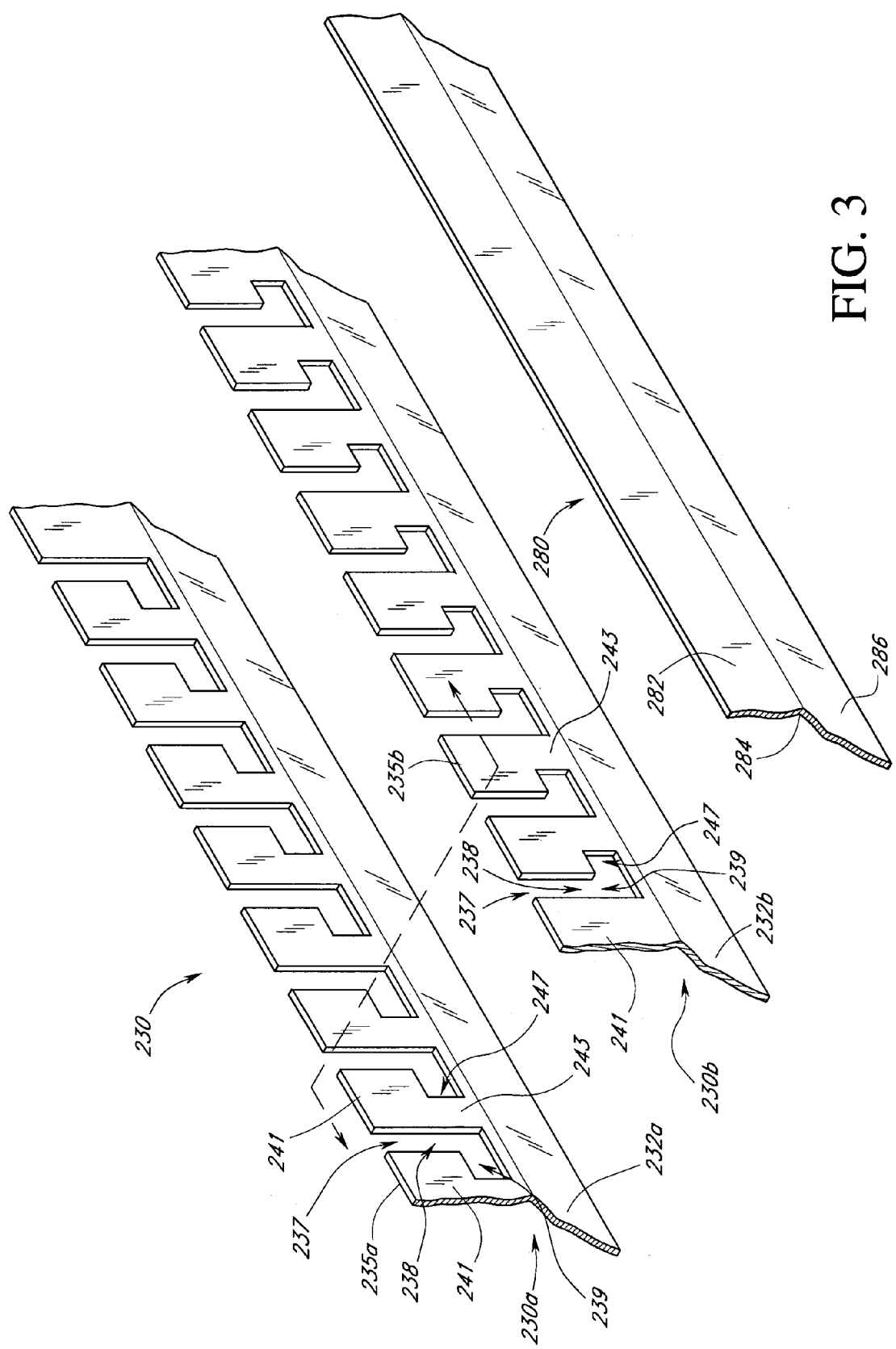
FIG. 3 illustrates a disassembled view of the seal assembly in FIG. 1 comprising, in one embodiment, the reinforcing member, a first interlocking member, and a second interlocking member.

FIGS. 3–5 illustrate various embodiments of the perimeter seal assembly 230. In particular, FIG. 3 illustrates a disassembled view of the seal assembly 230 comprising, in one embodiment, the reinforcing member or section 280, a first interlocking member 230a, and a second interlocking member 230b. In addition, FIG. 4 illustrates an assembled view of the seal assembly of FIG. 3, wherein the first and second interlocking members 230a, 230b are coupled to the reinforcing member 280 so as to define a resilient section 250. Also, FIG. 5 illustrates a top view of the seal assembly 230 shown in FIG. 4.

As illustrated in FIG. 3, the first and second interlocking members 230a, 230b may include a mounting section 232a, 232b and a plurality of tabs or tab components 235a, 235b, which extend outward from the mounting section 232 at an angle. As illustrated, the first interlocking member 230a comprises a first plurality of tab components 235a, and the second interlocking member 230b comprises a second plurality of tab components 235b. In one embodiment, the angle may range from of 0 to 90 degrees from the plane of the mounting section 232. In another embodiment, the angle may range from of 35 to 45 degrees from the plane of the mounting section 232. The tab components 235a, 235b may be separated from each other by slotted regions 237, which, for example, may include a vertical section 238 that extends along the full length of each tab component 235a, 235b, and a horizontal section 239 that extends underneath an upper sealing section 241 of the tab components 235a, 235b so as to define a rectangular recess 247. Additionally, the horizontal section 239 of the slotted regions 237 may also define the tab components 235a, 235b with a narrower neck section 243, which connects the upper sealing section 241 of the tab components 235a, 235b to the mounting section 232.

In one aspect, the horizontal section 239 of the slotted regions 237 may be sized such that the rectangular recess 247 is approximately the same size as the neck section 243 of each of the tab components 235a, 235b. Additionally, as further illustrated in FIG. 3, the first plurality of tab components 235a of the first interlocking member 230a are oriented in a direction opposite the second plurality of tab components 235b of the second interlocking member 230b. Subsequently, as illustrated in FIGS. 4, 5, the first interlocking member 230a may be mated, coupled, or assembled to the second interlocking member 230b such that the upper sealing sections 241 of the first plurality of tab components 235a overlap a portion of the upper sealing sections 241 of the second plurality of tab components 235b and communicate therewith to form a interlocking seal therebetween.

In addition, alternating neck sections 243 of the tab components 235a, 235b are positioned in the rectangular recess 247 defined by the horizontal section 239 of the slotted regions 237. In one aspect, the neck sections 243 of the tab components 235a, 235b may not significantly overlap, however, the sealing upper sections 242 of the tab components 235a, 235b do overlap. As the neck portions 241 do not significantly overlap, the tab components 235a, 235b have greater flexibility and can be more readily deform as a result of contact with the sealing surface in a direction that is normal to the plane of the upper sealing section 241 of the tab components 235a, 235b. Further scope and functionality of the tab components 235a, 235b will be described in greater detail herein below.

As discussed above, the structural components of the heat exchanging apparatus 200 may undergo thermal distortion as a result of the operational temperature gradients in the heat exchanging apparatus 200. In one aspect, the temperature gradients may cause the radial walls of the rotor 202 to undergo thermal growth and expansion toward the outer housing 204. Therefore, the gap distance between the outer radial edge of the radial walls 202 and the side surface of the inner wall 224 may decrease as a result of thermal growth and expansion. Advantageously, the resilient section 250 of the seal assembly 230 allows the seal assembly 230 to deflect as the gap distance decreases in a manner as further described herein below. As previously mentioned, the tab components 235a, 235b of the interlocking members 230a, 230b may be configured to compress and expand in a spring-like manner so as to adapt to harsh operating conditions and decrease the overall size of the seal assembly 230. As a result, the resilient section 250 of the seal assembly 230 allows the seal assembly 230 to absorb the mechanical stresses created by the reduction in distance between the outer radial edge of the rotor 202 and the inner surface of the outer housing 204.

In one embodiment, the seal assembly 230 may comprise the sealing section 241 having resilient tab components 235a, 235b with interlocking features such that the interlocking features couple so as to define the sealing section 241 when assembled. The sealing section 241 may be positioned so as to at least partially span the bypass gap 220 between the rotor 202 and the inner wall of the housing 204 and engage with at least a portion of the rotor 202 and the inner wall of the housing 204 in a manner so as to resiliently deform in a direction relative to the direction of rotation. The seal assembly 230 may further comprise the reinforcing section 280 with a positional orientation interposed between the rotor 202 and the inner wall of the housing 204 so as to cover at least a portion of the interlocking features of at least one of the resilient tab components 235a, 235b. In addition, the reinforcing section 280 may also be positioned with respect to the sealing section 241 so as to reinforce the sealing section 241 when deformed during rotation to thereby inhibit damage to the sealing section 241 as a result of the deformation in a manner that will be described in greater detail herein below.

As further illustrated in FIG. 3, the reinforcing section 280 may comprise a contact component 282, a biasing component 284, and a base component 286 that may be formed so as to contour the structural shape of the seal assembly 230. The base component 286 may comprise a substantially planar structure that distally extends in a direction substantially parallel to the mounting surface of at least one of the outer radial edge of the rotor 202 and the inner surface of the outer housing 204 as illustrated in FIGS. 2A, 2B. The biasing component 284 may be attached to a first distal end of the base component 286 where the base component 286 and the contact component intersect. The biasing component 284 may further comprise a first bend contouring the angular displacement of the contact component 282 that provides a biasing force that reinforces and/or stabilizes the contact component 282. The contact component 282 may be attached to the biasing component 284 after the first bend and may comprise a flat, elongated, planar structure that is substantially parallel to the resilient section 250 of the seal assembly 230. Further scope and functionality of the reinforcing section 280 will be described in greater detail herein below with reference to FIG. 6A.

As further illustrated in FIGS. 4, 5, the upper sealing sections 242 of the tab components 235a, 235b may be bent subsequent to assembly of the sealing members 230a, 230b so that the faces of each of the tab components 235a, 235b are positioned adjacent each other. In addition, each tab component 235a, 235b may be positioned in the slotted regions 237 so that a first lateral side 260a of a first tab component 235a on the first interlocking member 230a is positioned adjacent a first face 252 of a second tab component 235b on the second interlocking member 230b. Moreover, the first tab component 235a on the first interlocking member 230a may comprise a bent section 254 so that a second lateral side 260b of the first tab component 235a is positioned adjacent a second face 254, opposite the first face 252, of the second tab component 235b on the second member 230b. It should be appreciated that, as shown in FIGS. 5, 6, each of the tab components 235a, 235b on each of the interlocking members 230a, 230b may be similarly configured and positioned.

In one embodiment, the first lateral side 260a and the second lateral side 260b of the first tab component 235a may be flattened so that the inner face of each of the lateral sides 260a and 260b are positioned adjacent the outer faces 252, 254 of the second tab component 235b, respectively. In addition, the tab components 235a, 235b may comprise a metallic material, such as stainless steel that is approximately $\frac{1}{32}$" in thickness, wherein, as illustrated in FIGS. 5, 6, the slotted regions 237 of the interlocking members 230a, 230b may comprise a thickness of at least the thickness of the tab components 235a, 235b. In another embodiment, the seal assembly 230 may comprise a thickness of at least the thickness of two overlapping tab components 235a, 235b.

Advantageously, the mechanical and structural rigidity of the seal assembly 230 may be enhanced due to the double tab 235 thickness of coupling the first and second interlocking members 230a, 230b. Additionally, since the tab components 235a, 235b are distally spaced from neighboring tab components 235a, 235b on each interlocking member 230a, 230b, each tab component 235a, 235b retains a higher degree of flexibility allowing for greater resilient deformation of each tab component 235a, 235b with respect to the face of the tab components 235a, 235b. Thus, as a result, the seal assembly 230 provides for increased structural and mechanical strength while still allowing for greater flexibility and resilient deformation.

With reference to FIGS. 2A, 2B, the seal assembly 230, in one embodiment, may function in the following manner. The seal assembly 230 may be mounted to the heat exchanger 200 in a manner such that the sealing sections 241 of the tab components 235a, 235b are positioned substantially adjacent to the sealing surface 242. When the rotor 202 deforms as a result of turndown, the tab components 235a, 235b make contact with the sealing surface 242. Since the tab components 235a, 235b are flexible, the tab components 235a, 235b resiliently deform when in contact with the sealing surface 242. If the deformation as a result of turndown decreases, the tab components 235a, 235b are biased by the bend between the mounting section 232 and the neck portion 243 of the tab components 235a, 235b so as to maintain contact or a desired spacing with the sealing surface 242. As a result, the seal assembly 230 may be adapted to resiliently deform so as to maintain contact or a desired spacing with the sealing surface over a range of deformation of the rotor 202.

Advantageously, since the tab components 235a, 235b are separated from each other by the slotted regions 237, each of the tab components 235a, 235b are independently flexible, which provides greater flexibility and greater resiliency of the seal assembly 230. Moreover, since the tab components 235a, 235b overlap and interlock, the bypass gap 220 between the rotor 202 and the inner wall of the housing 204 may be substantially occluded by the seal assembly 230 to thereby reduce gas leakage, which may improve the efficiency of the machinery to which the preheater 200 is attached.

Figure 6A:
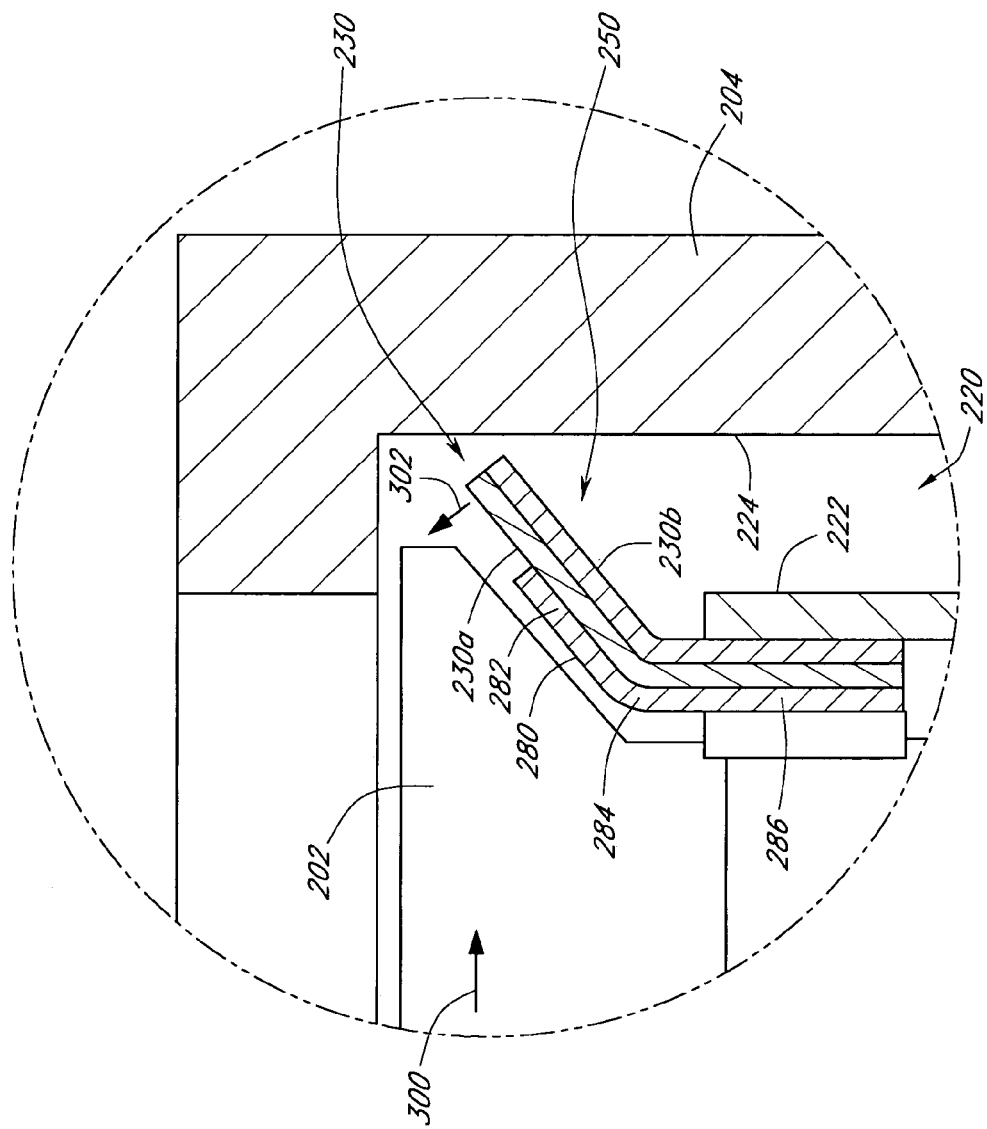
FIG. 6A illustrates one embodiment of the heat exchanger undergoing thermal expansion, wherein the expansion stress causes the seal assembly to deflect in a direction relative to the direction of thermal expansion.

In one embodiment, referring now to FIG. 6A, the heat exchanging body or the outer housing 204 rotates with respect to the rotor 202. During operation, the rotor 202 undergoes thermal expansion in a first direction 300, wherein the expansion stress on the seal assembly 230 causes the resilient section 250 of the seal assembly 230 to deflect in a second direction 302 relative to the first direction 300. The deflection of the seal assembly 230 causes the contact component 282 of the reinforcing section 280 to engage and reinforce the resilient section 250 of the seal assembly 230 along the elongated portion of the contact component 282 in a manner so as to distribute the bending stress of the lower resilient section 250 caused by the expansion stress across the flat, planar surface of the contact component 282.

Advantageously, the reinforcing section 280 reduces the adverse effects of expansion stress at the position of the biasing component 284 by reinforcing the resilient section 250 of the seal assembly 230 at the position where the contact component 284 engages the lower portion of the resilient section 250. It should be appreciated that the rotor 202 rotates within the housing 204 and the interlocking members 230a, 230b of the resilient section 250 compress in the second direction 302 during rotation as the rotor 202 expands in the first direction 300 so as to adapt to the shape of the inner surface 224 of the housing 204. The reinforcing section 280 of the seal assembly 230 reinforces the lower portion of the seal assembly 230 by counter-deflecting the resilient section 250 in a direction substantially opposite the second direction 302 to thereby strengthen the structural rigidity of the seal assembly 230.

In one aspect, the deflection of the seal assembly 230 causes rotational stress in the second direction 302 about the intersection point of the contact component 282 and the base component 286, which causes compression energy to be stored in the biasing component 284 of the reinforcing section 280 in a manner similar to storing energy in a spring. In response to the force in the second direction 302 and the resultant stored energy in the biasing component 284, the biasing component 284 produces an opposing force in a direction opposite of the second direction 302 so as to further reinforce the resilient section 250 of the seal assembly 230 along the elongated portion of the contact member 282 and to distribute the rotational force across the flat, planar surface of the contact component 282. Advantageously, the reinforcing section 280 reduces the rotational stress at the interconnection point of the contact component 282 and the base component 286 by biasing and stabilizing the resilient section 250 of the seal assembly 230 at the contact location where the reinforcing section 280 engages the lower portion of the resilient section 250. Furthermore, the reinforcing section 280 substantially inhibits over-flexing of the resilient section 250 when the seal assembly 230 is deformed during rotation and thermal expansion.

In one embodiment, the tab components 235a, 235b of the interlocking members 230a, 230b expand and retract in response to the operational and/or rotational load so that the resilient section 250 of the seal assembly 230 orients at an angle relative to the plane of the mounting section 232. Advantageously, the tab components 235a, 235b recover back to their original shape when the operational and/or rotational stress on the sealing assembly 230 is removed, so that the tab components 235a, 235b re-orient and/or recover to a position substantially similar to their original position. Therefore, the resilient section 250 provides flexibility to the seal assembly 230 to facilitate the rotational deflection of the seal assembly 230 in response to the thermal expansion and rotational stress of the rotor 202. In addition, the outer edge of the tab components 235a, 235b maintains sliding contact with the inner surface 224 of the housing 204 to thereby maintain a seal between the radial walls of the rotor 202 and the inner wall 224 of the outer housing 204.

Advantageously, by reducing the amount of bending or over-flexing of the resilient section 250 at the interconnection point with the mounting section 232, the seal assembly 230 may thereby be strengthened to substantially inhibit the resilient section 250 from fracturing or separating at the interconnection point. As illustrated in FIG. 6A, the reinforcing section 280 may be configured to substantially inhibit the damaging effects of bending and/or deflection of the seal assembly 230 when the resilient section 250 expands during thermal heating and/or is warped, deformed, or distorted during rotation or other various operational applications. For example, when the resilient section 250 of the seal assembly 230 produces a force in the second direction 302 during expansion, the reinforcing section 280 produces an opposing force in the direction opposite the second direction 302 so as to increase the biasing strength of the seal assembly 230 in the second direction 302 during expansion.

Additionally, in one aspect, the reinforcing section 280 may comprise a bent piece of metal, plastic, etc. that has contours similar to the contours of the interlocking members 230a, 230b and/or tab components 235a, 235b. Also, the reinforcing section 280 may further be flexible such that the reinforcing section 280 bends and/or flexes in response to contact with the resilient section 250 of the seal assembly 230. Advantageously, in a manner as previously described, the reinforcing section 280 may also provide a biased force against the resilient section 250 of the seal assembly 230 in opposition to the bending and/or flexing motion of the tab components 235a, 235b during expansion and/or rotation to thereby inhibit damage, fracture, separation, and/or breakage at the interconnection point of the interlocking members 230a, 230b and the mounting section 232.

Figure 6B:
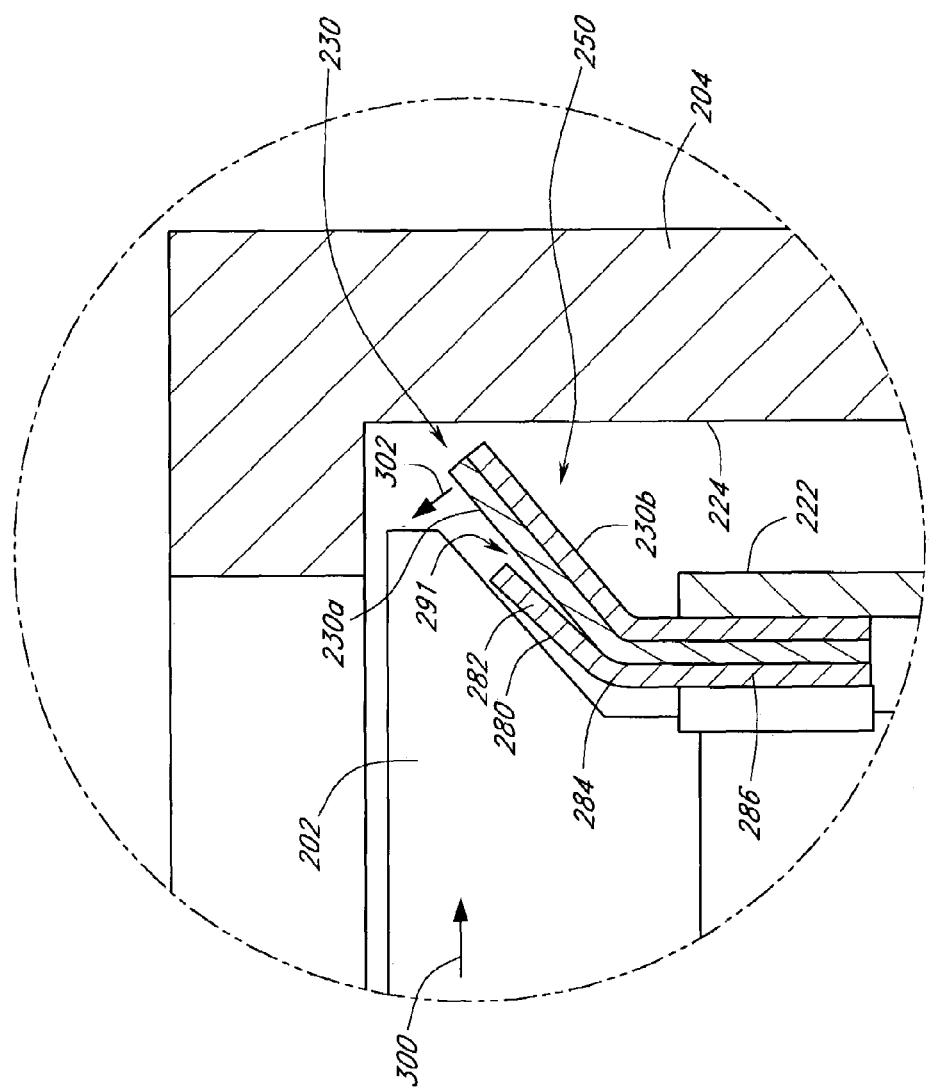
FIG. 6B illustrates an alternate embodiment of the seal assembly.

FIG. 6B illustrates an alternate embodiment of the seal assembly 230. As illustrated in FIG. 6B, the reinforcing member or section 280 may be positioned adjacent the interlocking members 230a, 230b so as to define a deflection gap 291 therebetween. When the rotor 202 undergoes thermal expansion in the first direction 300, the interlocking members 230a, 230b can deflect the width of the deflection gap 291 until the members 230a, 230b engage the reinforcing section 280. Advantageously, the deflection gap 291 allows the seal assembly 230 to deform a greater distance before the interlocking members 230a, 230b engage the reinforcing section 280. Therefore, it should be appreciated that the seal assembly 230 functions in a similar manner as previously described with reference to FIG. 6A except that the deflection gap 291 allows for greater flexibility of the interlocking members 230a, 230b prior engagement with the reinforcing section 280.

Figure 7A:
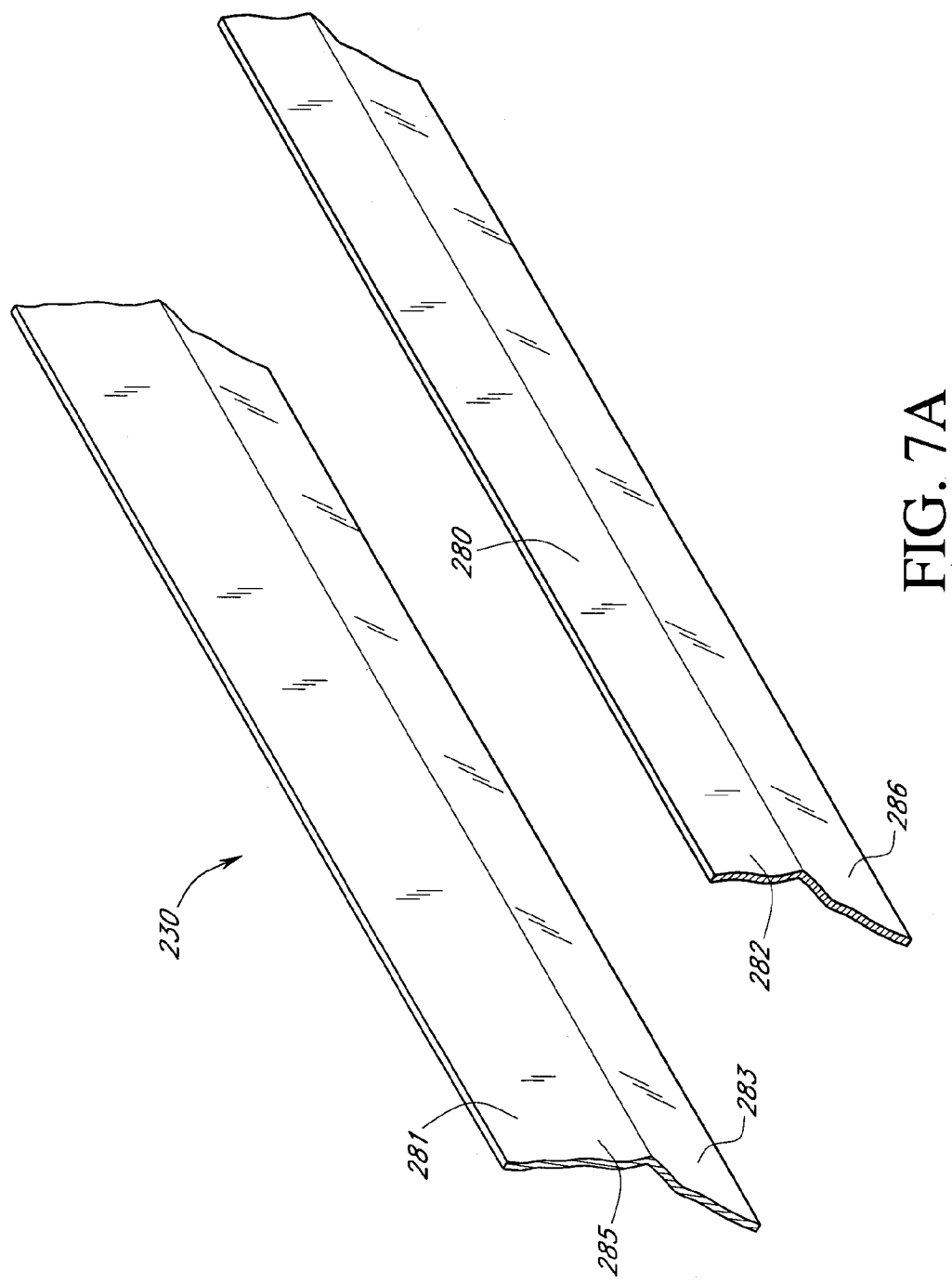
FIGS. 7A–7B illustrate a disassembled view of another embodiment of the seal assembly.
Figure 7B:
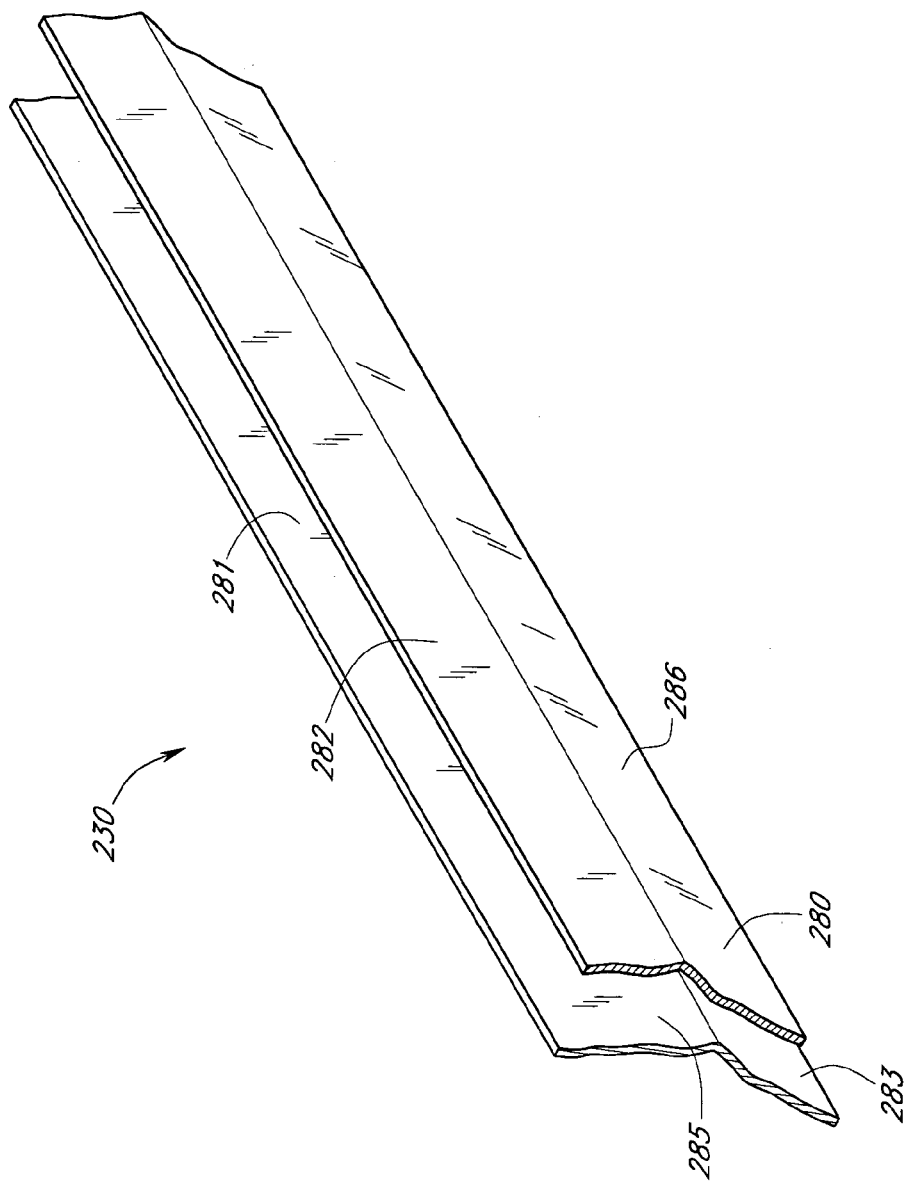

Additionally, FIG. 7A illustrates a disassembled view of another embodiment of the seal assembly 230 comprising the reinforcing section 280 and a sealing member 281 having a mounting section 283 and a sealing section 285 that extends outward from the mounting section 283 at an angle. FIG. 7B illustrates the reinforcing section 280 positioned adjacent the sealing member 285. As illustrated in FIGS. 7A–7B, the sealing section 285 comprises a single unitary component and is adapted to function in a similar manner as the interlocking members 230a, 230b when the first and second interlocking members 230a, 230b are coupled together. Therefore, in one aspect, the first and second interlocking members 230a, 230b may be formed as a single unitary component and mounted to the reinforcing section 280 so as to function in a manner as previously described with reference to the interlocking members 230a, 230b of FIGS. 3–6B.

Figure 7C:
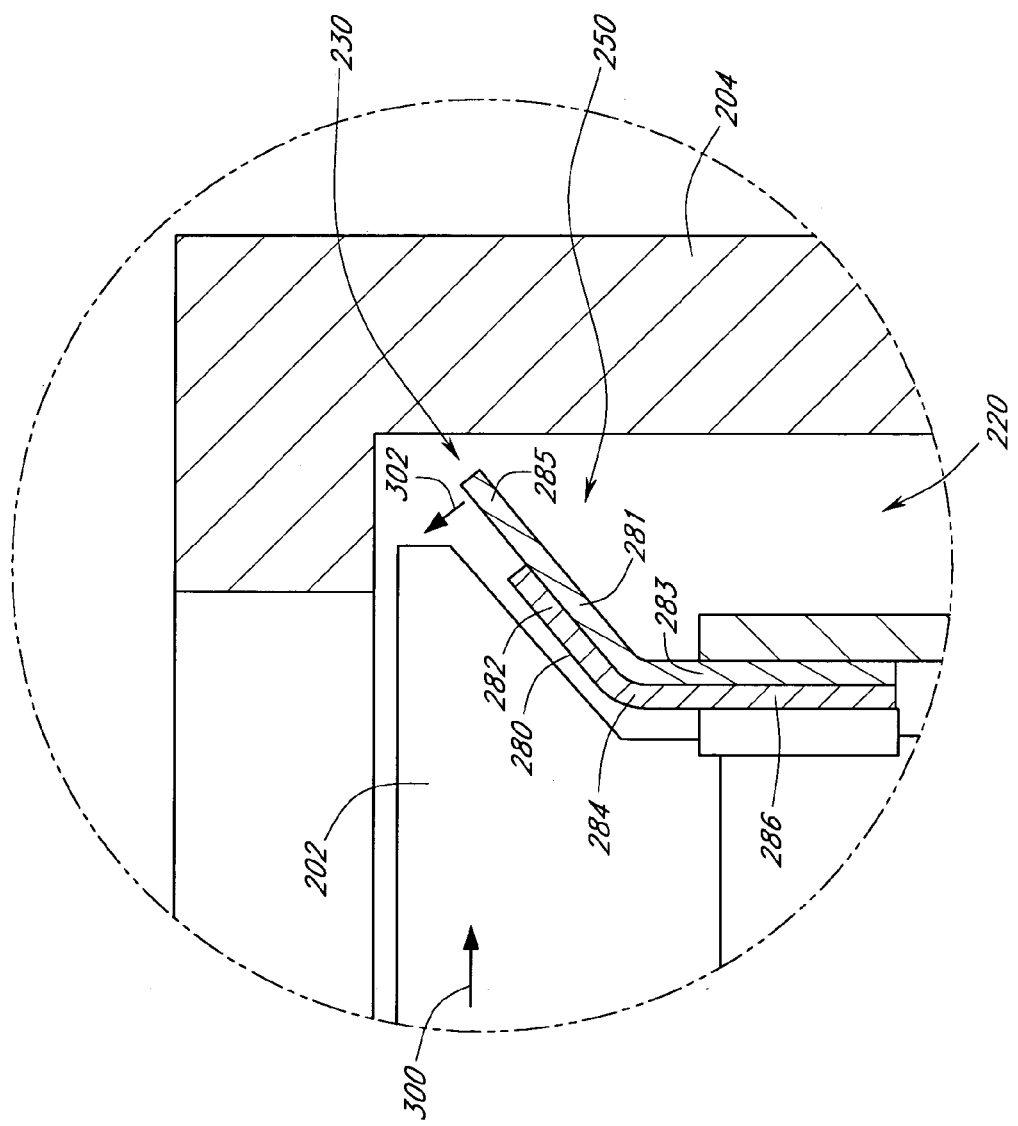
FIGS. 7C–7D illustrate a cross-sectional view of the seal assembly.
Figure 7D:
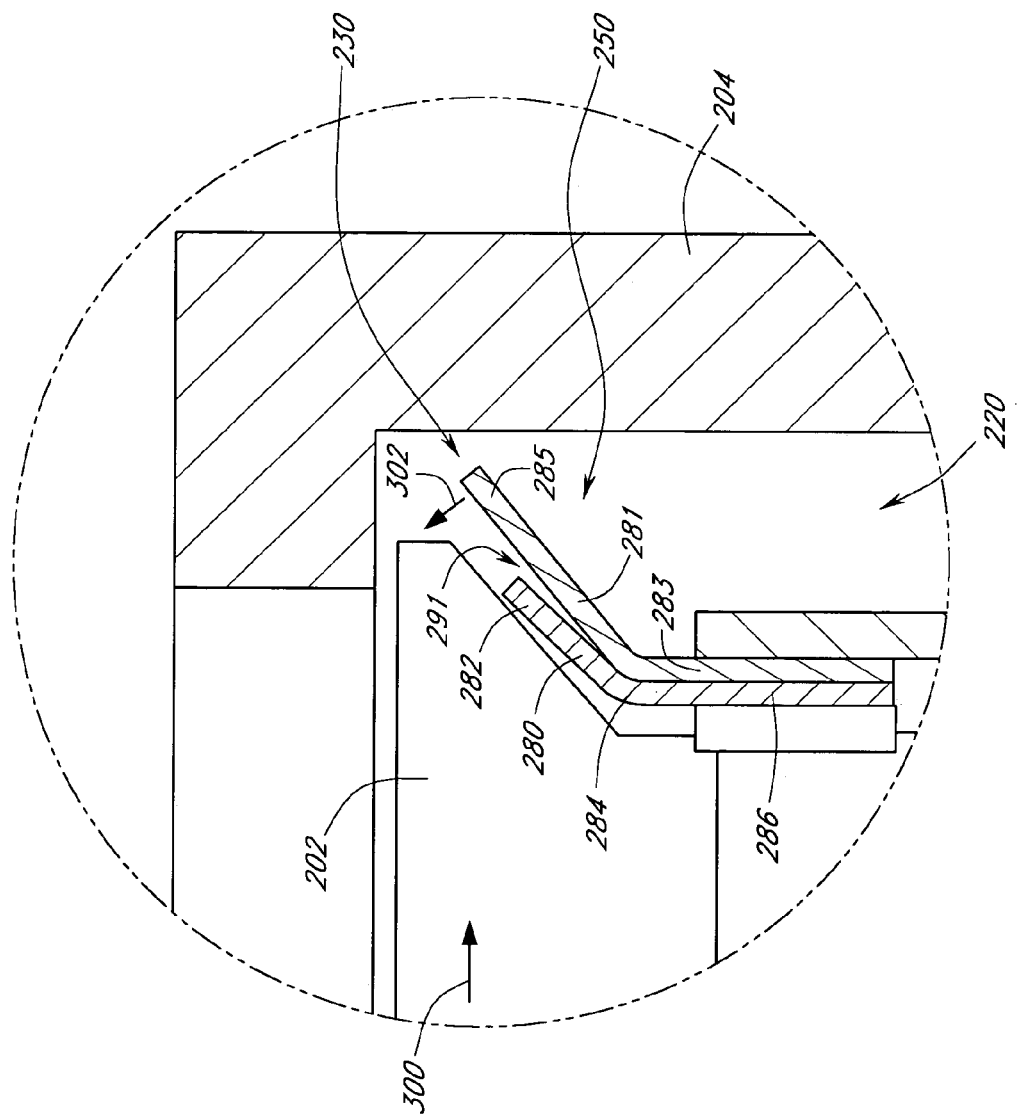

FIG. 7C illustrates a cross-sectional view of the seal assembly 230 with reference to the embodiment of FIGS. 7A–7B and the view as illustrated in FIG. 6A. As illustrated in FIG. 7C, the reinforcing section 280 and the sealing member 281 are mounted to the rotor 202 in a manner as previously described. Referring now to FIG. 7D, the reinforcing section 280 may be positioned adjacent the sealing member 281 so as to define the deflection gap 291 therebetween. As previously described, when the rotor 202 undergoes thermal expansion in the first direction 300, the interlocking members 230a, 230b can deflect the width of the deflection gap 291 until the sealing member 281 engages the reinforcing section 280. Advantageously, the deflection gap 291 allows the seal assembly 230 to deform a greater distance before the sealing member 281 engages the reinforcing section 280.

Although the foregoing description of the preferred embodiment of the present invention has shown, described and pointed out the fundamental novel features of the invention, it will be understood that various omissions, substitutions and changes in the form of the detail of the apparatus as illustrated as well as the uses thereof, may be made by those skilled in the art without departing from the spirit of the present invention. Consequently, the scope of the present invention should not be limited to the foregoing discussion, but should be defined by the claims.

What is claimed is:

1. A seal assembly for a regenerative air preheater having a heat exchanging body that rotates in a first direction with respect to a housing and is distally spaced from the housing so as to define a gap therebetween, the seal assembly comprising:
    a sealing section that is positioned to at least partially span the gap between the heat exchanging body and the housing, wherein the sealing section includes a deformable biasing section that engages with at least a portion of both the housing and the heat exchanging body in a manner so as to resiliently deform in a second direction relative to the first direction during rotation; and
    a reinforcing member interposed between the housing and the heat exchanging body so as to cover at least a portion of the sealing section, wherein the reinforcing member is positioned with respect to the sealing section so as to reinforce the sealing section when the sealing section is deformed in the second direction, the reinforcing member constructed to apply a counter-deflection force on the sealing section in a direction substantially opposite to the second direction to limit the deformation of the sealing section and thereby inhibit damage to the sealing section as a result of the deformation during rotation,
    wherein the reinforcing member is positioned adjacent the sealing section so as to define a deflection gap therebetween so that the sealing section deforms the width of the deflection gap prior to engaging the reinforcing member during rotation.

2. The seal assembly of claim 1, wherein the sealing section comprises a first resilient member with interlocking features and a second resilient member having interlocking features coupled to the interlocking features of the first resilient member.

3. The seal assembly of claim 2, wherein the coupled interlocking features define the deformable biasing section of the sealing section.

4. The seal assembly of claim 3, wherein the reinforcing member is interposed between the housing and the heat exchanging body so as to cover at least a portion of the interlocking features of at least one of the resilient members.

5. The seal assembly of claim 2, wherein the reinforcing member further provides a biasing force in a direction relative to the movement of the first and second resilient members.

6. The seal assembly of claim 1, wherein the heat exchanging body comprises a rotor.

7. The seal assembly of claim 6, wherein the sealing section includes a mounting section that mounts to the rotor and a contact section that contacts the housing with the deformable biasing section interposed therebetween.

8. The seal assembly of claim 7, wherein the mounting section and the contact section of the seal member are urged towards each other when the contact section contacts the housing.

9. The seal assembly of claim 8, wherein the reinforcing member is mounted to the rotor so that the reinforcing member inhibits movement of the contact section and the mounting section towards each other.

10. The seal assembly of claim 9, wherein the reinforcing member comprises a biasing section that provides resilient biasing against movement of the contact section of the seal member towards the mounting section of the seal member.

11. The seal assembly of claim 10, wherein the biasing section of the reinforcing member comprises a bent section that contours the structural shape of at least one of the first and second resilient members.

12. The seal assembly of claim 11, wherein the biasing section of the reinforcing member contacts the first and second resilient members so that the reinforcing member inhibits movement of at least a portion of the first and second resilient members in the direction substantially perpendicular to the first direction.

13. The seal assembly of claim 1, wherein the reinforcing member comprises a mounting section that mounts to the heat exchanging body, a contact section that contacts the seal member, and a biasing section.

14. The seal assembly of claim 13, wherein the biasing section comprises a bent section that is angularly displaced from a position substantially perpendicular to the housing.

15. The seal assembly of claim 14, wherein the contact section comprises an elongate section that contacts at least one of a first and a second resilient members so as to oppose movement of the first and second resilient members in the direction substantially perpendicular to the first direction.

16. The seal assembly of claim 15, wherein the contact section deflects in the direction substantially perpendicular to the first direction during rotation so as to engage the sealing section and distributes the deflection force along the elongate section.

17. A regenerative air preheater device comprising:
   an enclosure;
   a rotor that rotates in a first direction with respect to the enclosure and is distally spaced from the enclosure so as to define a bypass gap therebetween; and
   a seal assembly positioned to at least partially span the bypass gap, wherein the seal assembly comprises a resilient member having a deformable biasing section that resiliently deforms in a second direction relative to the first direction in response to contact with at least a portion of the enclosure during rotation, and wherein the seal assembly further comprises a reinforcing member interposed between the rotor and the resilient member that reinforces the resilient member when the resilient member is deformed in the second direction, the reinforcing member configured to apply a force on the resilient member in a direction generally opposite to the second direction to limit the deformation of the resilient member, thereby inhibiting damage to the seal assembly as a result of the deformation during rotation, wherein the reinforcing member is positioned adjacent the resilient member so as to define a deflection gap therebetween so that the seal assembly deforms the width of the deflection gap prior to engaging the reinforcing member during rotation.

18. The device of claim 17, wherein the resilient member comprises a first resilient component having a first plurality of interlocking features and a second resilient component having a second plurality of interlocking features coupled to the first plurality of interlocking features.

19. The device of claim 17, wherein the seal assembly is mounted to the rotor so as to at least partially span the bypass gap.

20. The device of claim 17, wherein the rotor comprises a heat exchanging body, and wherein the enclosure comprises a housing.

21. The device of claim 17, wherein the resilient member includes a mounting section that mounts to the rotor and a contact section that contacts the enclosure with the deformable biasing section interposed therebetween.

22. The device of claim 21, wherein the mounting section and the contact section are urged towards each other when the contact section contacts the enclosure.

23. The device of claim 22, wherein the reinforcing member is mounted to the rotor so that the reinforcing member inhibits movement of the contact section and the mounting section towards each other.

24. The device of claim 23, wherein the reinforcing member comprises a biasing section that provides resilient biasing against movement of the contact section towards the mounting section.

25. The device of claim 24, wherein the biasing section of the reinforcing member comprises a bent section that contours the structural shape of the resilient member.

26. The device of claim 25, wherein the biasing section of the reinforcing member contacts the resilient member so that the reinforcing member inhibits movement of resilient member in a direction substantially perpendicular to the first direction.

27. The device of claim 26, wherein the reinforcing member further provides a biasing force in a direction relative to the movement of the resilient member.

28. The device of claim 17, wherein the reinforcing member comprises a mounting section that mounts to the rotor, a contact section that contacts the resilient member, and a biasing section.

29. The device of claim 28, wherein the biasing section of the reinforcing member comprises a bent section that is angularly displaced from a position substantially perpendicular to the enclosure.

30. The device of claim 29, wherein the contact section of the reinforcing member comprises an elongate section that contacts the resilient member so as to oppose movement of the resilient member in the direction substantially perpendicular to the first direction.

31. The device of claim 30, wherein the contact section of the reinforcing member deflects in the direction substantially perpendicular to the first direction during rotation so as to engage the resilient member and distributes the deflection force along the elongate section.

* * * * *